F. R. NOONAN.
AIR PURIFYING DEVICE FOR CREAMERY VATS.
APPLICATION FILED JAN. 6, 1910.
1,063,583.
Patented June 3, 1913.
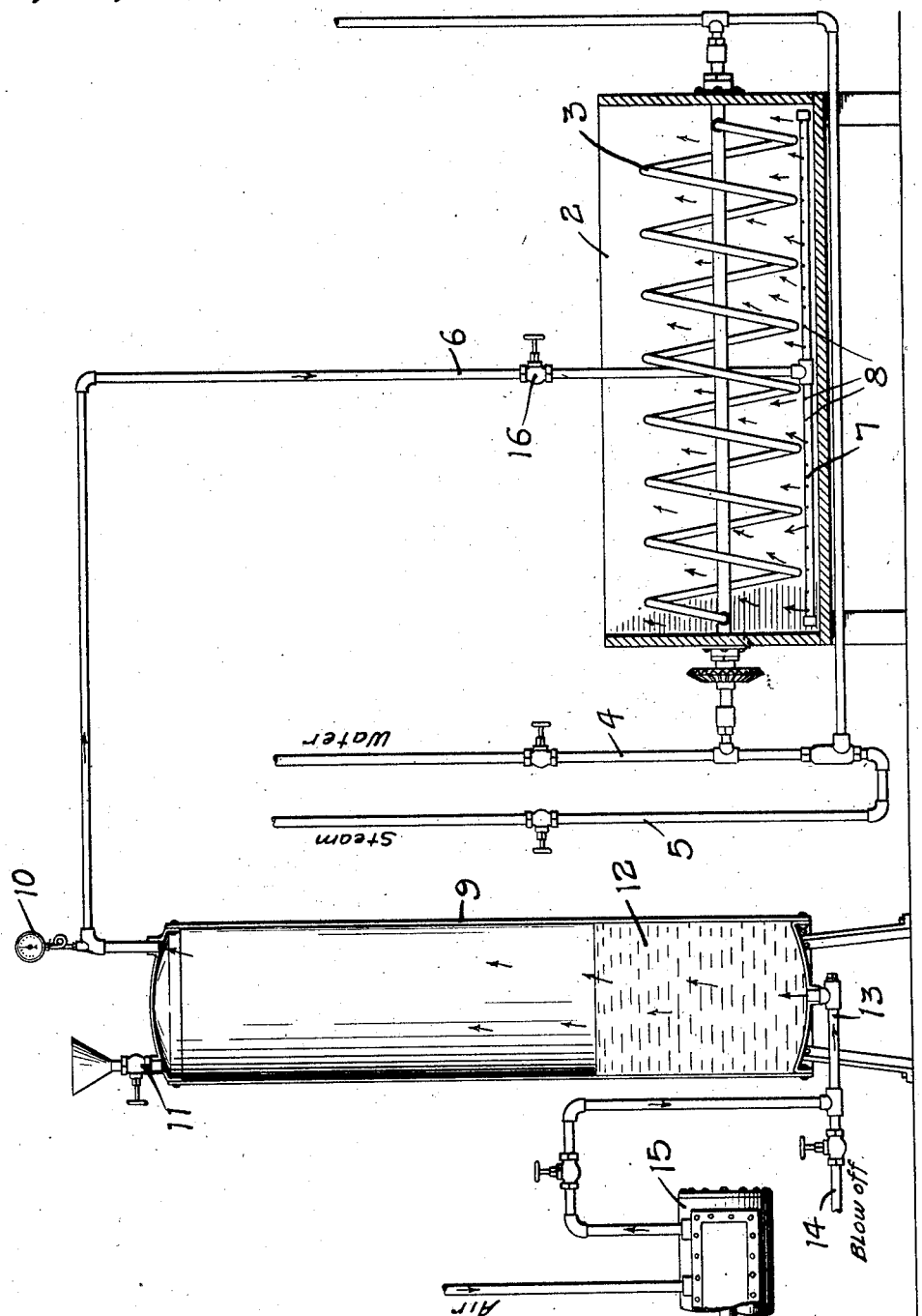
WITNESSES
INVENTOR
FRANK R. NOONAN
BY
ATTORNEYS

UNITED STATES PATENT OFFICE.

FRANK R. NOONAN, OF ALEXANDRIA, MINNESOTA.

AIR-PURIFYING DEVICE FOR CREAMERY-VATS.

1,063,583.  Specification of Letters Patent.  Patented June 3, 1913.

Application filed January 6, 1910. Serial No. 536,706.

*To all whom it may concern:*

Be it known that I, FRANK R. NOONAN, of Alexandria, Douglas county, Minnesota, have invented certain new and useful Improvements in Air-Purifying Devices for Creamery-Vats, of which the following is a specification.

My invention relates to devices for cooling or aerating cream or milk and the object of the invention is to provide an air purifying means through which the air is passed before delivery to the cream or milk vat.

My invention consists generally in interposing a tank containing a purifying agent, such as lime, between the vat and the air pumps.

In the accompanying drawings forming part of this specification, the figure is a sectional view illustrating the application of my invention to a cream or milk vat.

In the drawing, 2 represents a vat adapted to contain cream or milk and having the usual coil 3 driven from a suitable means, not shown, and connected with the water and steam pipes 4 and 5, in any preferred manner.

6 is an air pipe through which air is supplied to the lower portion of the vat through a header 7 having a series of perforations 8. A closed tank 9 is connected with the pipe 6 and has a pressure gage 10 and a filling opening and valve 11 through which the purifying agent is deposited in the tank.

12 represents a body of lime, freshly slaked in liquid form, which I prefer to employ as a purifying agent, which is inserted into the tank through the opening 11 and rests upon the bottom thereof, forming a mass of suitable depth through which the currents of air must pass before entering the upper portion of the tank. These currents of air are delivered to the bottom of the tank 9 through a pipe 13 which has a blow off 14 and is connected to an air pump 15 or ordinary construction. A valve 16 regulates the delivery of air to the vat. The currents of air, entering the bottom of the tank, will work up through the lime, bubbling up at the top thereof and throwing the lime upward and keeping it in motion within the tank. The air in the tank will thus be thoroughly purified and will pass out of the tank and through the pipe 6 to the bottom of the vat and be discharged into the body of cream or milk therein. I have found this method of aerating the contents of the vat to be very effective and at the same time the device is an extremely simple and inexpensive adjunct to an apparatus for treating cream or milk.

I have shown the preferred manner of connecting the vat with the receptacle containing the purifying agent, but do not wish to confine myself to this arrangement as the connections may be varied and the receptacle for the purifying agent may be modified in various ways without departing from my invention. I have found, however, that where a purifying agent receptacle of this form is employed, that the lime blown up into the open upper portion of the tank by the pressure of the air current will spread out in a thin spray, and thoroughly wash and cleanse the air in its passage to the outlet at the top of the tank.

I claim as my invention:—

A device of the class described comprising a vat adapted to contain cream or milk, a pipe through which air may be delivered within said vat near the bottom thereof, a closed tank having a pipe connection in its upper walls with said air pipe and vat and adapted to contain a liquid purifying agent, an air pump having a pipe connection with the lower walls of said tank below the level of said purifying agent, there being a comparatively large space within said tank above said purifying agent serving as a reservoir for the air accumulating under pressure therein, the air expanding within said tank and precipitating impurities which may have passed through said purifying agent, the pipe leading from said tank to said vat having a valve therein for regulating the flow of air under pressure to said vat.

In witness whereof, I have hereunto set my hand this 31st day of December, 1909.

FRANK R. NOONAN.

Witnesses:
L. C. CRONEN,
G. E. SORENSEN.